US008229492B2

(12) United States Patent
Panian et al.

(10) Patent No.: US 8,229,492 B2
(45) Date of Patent: Jul. 24, 2012

(54) THROTTLING TRANSMIT POWER IN A WWAN DEVICE BASED UPON THERMAL INPUT

(75) Inventors: James L. Panian, San Marcos, CA (US); Francesco Grilli, La Jolla, CA (US); Michael K. Spartz, Poway, CA (US); Daniel J. Lewis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 524 days.

(21) Appl. No.: 12/437,994

(22) Filed: May 8, 2009

(65) Prior Publication Data

US 2010/0285828 A1  Nov. 11, 2010

(51) Int. Cl.
*H04B 7/00* (2006.01)
(52) U.S. Cl. ..... 455/522; 455/126; 455/333; 455/452.2; 455/69; 455/86; 370/329; 370/230; 370/235; 370/252; 370/318; 725/62
(58) Field of Classification Search ............. 455/522, 455/355, 77, 73, 86, 333, 334, 452.2, 127.2, 455/127.1, 126.1, 69; 370/329, 318, 319, 370/321, 230, 328, 342, 377, 235, 252; 725/62
See application file for complete search history.

(56) References Cited

U.S. PATENT DOCUMENTS

| 5,519,886 A | 5/1996 | Gilbert et al. | |
|---|---|---|---|
| 7,158,489 B1 * | 1/2007 | Knuutila et al. | 370/318 |
| 7,606,566 B2 * | 10/2009 | Ogoshi | 455/423 |
| 7,729,722 B2 * | 6/2010 | Rofougaran et al. | 455/550.1 |
| 7,764,932 B2 * | 7/2010 | Rofougaran et al. | 455/77 |
| 7,949,309 B2 * | 5/2011 | Rofougaran et al. | 455/77 |
| 8,019,295 B2 * | 9/2011 | Fan | 455/127.2 |
| 2007/0021140 A1 * | 1/2007 | Keyes et al. | 455/522 |
| 2008/0007192 A1 * | 1/2008 | Williams et al. | 318/471 |
| 2008/0194215 A1 * | 8/2008 | Bolanos | 455/115.1 |
| 2009/0042525 A1 * | 2/2009 | Rajagopal et al. | 455/232.1 |
| 2009/0325517 A1 * | 12/2009 | Fan | 455/127.2 |
| 2010/0189042 A1 * | 7/2010 | Pan | 370/328 |

FOREIGN PATENT DOCUMENTS

EP          0800282 A2     10/1997
WO        WO0031990       6/2000

OTHER PUBLICATIONS

"International Search Authority and Written Opinion—PCT/US2010/033718—ISA-EPO—Nov. 4, 2010".

* cited by examiner

*Primary Examiner* — Lam T Mai
(74) *Attorney, Agent, or Firm* — Eric Ho

(57) ABSTRACT

Systems and methodologies are described that facilitate throttling transmit power of a WWAN module based upon thermal input. For instance, the thermal input can be a detected temperature, a signal from a computing device associated with the WWAN module, a signal from an alternate technology module (e.g., WiFi module, WiMax module, ...) associated with the WWAN module, or the like. A target transmit power of the WWAN module can be reduced (e.g., by a predetermined amount, ...) upon occurrence of a condition (e.g., the detected temperature exceeding a threshold, the computing device or the alternate technology module requesting a decrease in thermal power, ...), for example. Moreover, negotiation between the WWAN module and a base station can be effectuated to select an appropriate class (power class or Multi Slot Class) and/or operating mode when the target transmit power of the WWAN module is altered.

48 Claims, 13 Drawing Sheets

THROTTLING TRANSMIT POWER IN A WWAN DEVICE BASED UPON THERMAL INPUT

BACKGROUND

I. Field

The following description relates generally to wireless communications, and more particularly to throttling transmit power in a Wireless Wide Area Network (WWAN) device utilizing thermal input in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

According to an example, an access terminal can be a Wireless Wide Area Network (WWAN) device (e.g., WWAN module, . . . ) employed in conjunction with a computing device (e.g., notebook computer, handheld computer, personal digital assistant (PDA), . . . ). For instance, the WWAN device can be embedded in, removeably connectable to, etc. the computing device. However, the WWAN device can cause an overall ambient temperature of the computing device to rise (e.g., to a temperature level that detrimentally impacts performance of the computing device, one or more components associated with the computing device, and/or the WWAN device, . . . ). By way of illustration, the computing device can be sensitive to an amount of thermal energy to which it is exposed (e.g., lifetime of each component of the computing device can be a function of hot and cold temperatures to which such component is exposed, . . . ).

Changes in ambient temperature of the computing device can result from WWAN device operation. For example, increase in temperature can be caused by heat generated by a power amplifier on the WWAN device when transmitting data. Further, increase in temperature can result (e.g., to a lesser extent as compared to utilization of the power amplifier, . . . ) from heat generated by baseband processing of high speed data being downloaded by the WWAN device.

Conventional techniques typically fail to adequately account for the rise in temperature resulting from operation of WWAN devices. For instance, a common technique can include having WWAN devices operate in a manner similar to Wireless Local Area Network (WLAN) devices, where transmit power can be unilaterally reduced by the device itself when the temperature exceeds a threshold. However, unlike WWAN, WLAN base stations do not attempt to control the WLAN transmit power output on a computing device. WLAN devices operate in the unlicensed spectrum where behavior is much less regulated as compared to the licensed spectrum (e.g., in which WWAN devices operate, . . . ). Moreover, WWAN devices typically need to be qualified by global network operators to operate on their respective networks; to be qualified, WWAN devices commonly need to have transmission characteristics that meet requirements set by the global network operators. Thus, for example, the network typically governs transmit power employed by WWAN devices, which runs counter to allowing such devices to unilaterally alter their corresponding transmit power employed.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating throttling of transmit power of a WWAN module based upon thermal input. For instance, the thermal input can be a detected temperature, a signal from a computing device associated with the WWAN module, a signal from an alternate technology module (e.g., WiFi module, WiMax module, . . . ) associated with the WWAN module, or the like. A target transmit power of the WWAN module can be reduced (e.g., by a predetermined amount, . . . ) upon occurrence of a condition (e.g., the detected temperature exceeding a threshold, the computing device or the alternate technology module requesting a decrease in thermal power, . . . ), for example. Moreover, negotiation between the WWAN module and a base station can be effectuated to select an appropriate class (power class or Multi Slot Class) and/or operating mode when the target transmit power of the WWAN module is altered.

According to related aspects, a method that facilitates throttling transmit power of a WWAN module in a wireless communication environment is described herein. The method can include determining a target transmit power to be utilized by a WWAN module as a function of an obtained temperature related input. Further, the method can comprise negotiating with a base station to coordinate a transition to the target transmit power. Moreover, the method can include sending data via the WWAN module at or below the target transmit power.

Another aspect relates to a wireless communications apparatus. The wireless communications apparatus can include a WWAN module. The wireless communications apparatus can further include a memory that retains instructions related to selecting a target transmit power for the WWAN module based upon a received input pertaining to temperature, cooperating with a base station to coordinate a transition to the selected target transmit power, and transmitting data with the WWAN module at or below the target transmit power. Moreover, the wireless communications apparatus can include a processor, coupled to the memory, configured to execute the instructions retained in the memory.

Yet another aspect relates to a wireless communications apparatus that enables throttling transmit power for a WWAN module as a function of thermal related conditions in a wireless communication environment. The wireless communications apparatus can include means for adjusting a target transmit power utilized by a WWAN module based upon a temperature related input. Moreover, the wireless communications apparatus can include means for negotiating with a base station to select an updated class to be used by the WWAN module when the adjusted target transmit power is outside of a range set forth by a previously allocated class. Further, the wireless communications apparatus can include means for negotiating with the base station to select an updated operating mode to be employed by the WWAN module when the updated class is determined to be insufficient for the WWAN module.

Still another aspect relates to a computer program product that can comprise a computer-readable medium. The computer-readable medium can include code for determining a target transmit power for a WWAN module by evaluating a pre-programmed setpoint minus thermal algorithm adjustments. Further, the computer-readable medium can include code for comparing a temperature detected by the WWAN module to a threshold temperature. Moreover, the computer-readable medium can comprise code for lowering the target transmit power by a predetermined amount when the temperature detected by the WWAN module exceeds the threshold temperature.

In accordance with another aspect, an apparatus in a wireless communication system can include a processor, wherein the processor can be configured to alter a target transmit power utilized by a WWAN module based upon a temperature related input. Moreover, the processor can be configured to negotiate with a base station to select an updated class to be used by the WWAN module when the altered target transmit power is outside of a range set forth by a previously allocated class. Further, the processor can be configured to negotiate with the base station to select an updated operating mode to be employed by the WWAN module when the updated class is determined to be insufficient for the WWAN module.

According to other aspects, a method that facilitates coordinating WWAN module transmit power alterations based upon thermal input in a wireless communication environment is described herein. The method can include receiving data sent from a WWAN module at or below a first target transmit power level. Further, the method can include negotiating with the WWAN module to coordinate a transition to a second target transmit power level, the transition to the second target transmit power level being a function of a temperature related input obtained by the WWAN module. Moreover, the method can comprise receiving data sent from the WWAN module at or below the second target transmit power level subsequent to the transition.

Yet another aspect relates to a wireless communications apparatus that can include a memory that retains instructions related to coordinating a transition from a first target transmit power level to a second target transmit power level to be used by a WWAN module, the transition being based upon a temperature related input obtained by the WWAN module, and obtaining data sent from the WWAN module at or below the second target transmit power level subsequent to the transition. Further, the wireless communications apparatus can comprise a processor, coupled to the memory, configured to execute the instructions retained in the memory.

Another aspect relates to a wireless communications apparatus that enables coordinating control of transmit power employed by a WWAN module as a function of thermal input in a wireless communication environment. The wireless communications apparatus can include means for negotiating with a WWAN module to select an updated class to be used by the WWAN module when an adjusted target transmit power to be used by the WWAN module is outside of a range set forth by a previously allocated class. Moreover, the wireless communications apparatus can include means for negotiating with the WWAN module to select an updated operating mode to be employed by the WWAN module when the updated class is determined to be insufficient for the WWAN module. Further, the wireless communications apparatus can comprise means for receiving data sent via the WWAN module utilizing a transmit power equal to or less than the adjusted target transmit power.

Still another aspect relates to a computer program product that can comprise a computer-readable medium. The computer-readable medium can include code for negotiating with a WWAN module to identify an updated class to be used by the WWAN module when an adjusted target transmit power to be used by the WWAN module is outside of a range set forth by a previously allocated class. Further, the computer-readable medium can comprise code for negotiating with the WWAN module to determine an updated operating mode to be employed by the WWAN module when the updated class is determined to be insufficient for the WWAN module. Moreover, the computer-readable medium can include code for receiving data sent via the WWAN module utilizing a transmit power equal to or less than the adjusted target transmit power.

In accordance with another aspect, an apparatus in a wireless communication system can include a processor, wherein the processor can be configured to receive data sent from a WWAN module at or below a first target transmit power level. Further, the processor can be configured to negotiate with the WWAN module to coordinate a transition to a second target transmit power level, the transition to the second target transmit power level being a function of a temperature related input obtained by the WWAN module. Moreover, the processor can be configured to receive data sent from the WWAN module at or below the second target transmit power level subsequent to the transition.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
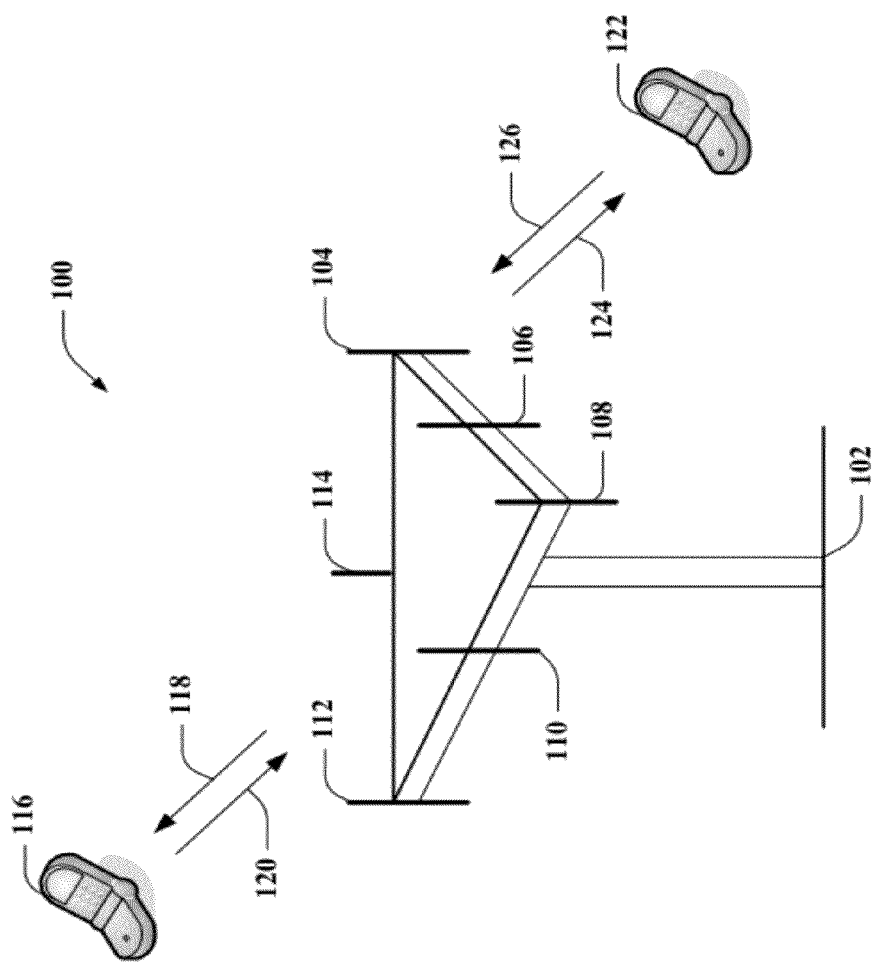
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), time division-synchronous code division multiple access (TD-SCDMA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE).

An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Access terminals 116 and 122 can each be a Wireless Wide Area Network (WWAN) device (e.g., WWAN module, . . . ) employed in conjunction with a computing device (e.g., notebook computer, handheld computer, personal digital assistant (PDA), . . . ); yet, it is appreciated that the claimed subject matter is not so limited. For instance, the WWAN device can be embedded in, removeably connectable to, etc. the computing device. According to another example, the WWAN device can be a 3G modem (e.g., 3G module, . . . ). By way of a further example, the WWAN device can be a Wideband Code Division Multiple Access (WCDMA) WWAN device. It is to be appreciated, however, that the claimed subject matter is not limited to the aforementioned examples.

The WWAN device can alter a temperature of the computing device with which it is employed. By way of illustration, when the computing device and corresponding WWAN device are positioned on an edge of a cell, the WWAN device commonly transmits at a maximum power to enable a signal to reach base station 102. The byproduct of transmitting at maximum power is generation of a maximum amount of thermal energy. Further, the associated computing device can be sensitive to this thermal energy introduced by the WWAN device. To compensate for changes in thermal energy, thermal models can be used to identify temperature(s) inside the computing device, types/characteristics of fans to incorporate therein, airflow design, and the like. Thus, thermal characteristics can be a key design consideration due to deleterious effects upon components of the computing device resultant from increases (or decreases) in ambient temperature to which the computing device is exposed.

Conventional techniques to address the impact of thermal energy introduced by the WWAN device oftentimes involve having the WWAN device behave in a manner similar to a Wireless Local Area Network (WLAN) device. In particular, when operating similarly to the WLAN device, such conventional WWAN device can be designed to unilaterally reduce its transmit power if it reaches a threshold temperature, where reduction in the transmit power can reduce the amount of thermal energy outputted into the associated computing device. However, numerous differences between WWAN devices and WLAN devices lead to these conventional techniques being improper for utilization in connection with WWAN devices. For instance, WLAN devices operate in the unlicensed spectrum, while WWAN devices operate in the licensed spectrum, and behavior of WLAN networks is not regulated nearly as much as WWAN networks. By way of further example, transmit power of a WWAN device can typically be a function of distance from base station 102; the WWAN device can be notified by the network (e.g., via base station 102, utilizing an over-the-air protocol, . . . ) to transmit at a given transmit power. The transmit power of each WWAN device (e.g., for code division multiple access (CDMA), ... ) can be governed to balance power densities at base station 102 corresponding to a plurality of WWAN devices throughout the network. Thus, base station 102 can notify a first WWAN device, which is positioned close to base station 102, to transmit at a lower power level as compared to a second WWAN device, which is positioned far from base station 102. Hence, common techniques that enable the WWAN device to alter its transmit power without coordination with base station 102 can negatively impact overall system operability.

In contrast, system 100 leverages coordination between a WWAN device and base station 102 to adjust a target transmit power level of the WWAN device based upon considerations of thermal energy (e.g., experienced by the WWAN device and/or corresponding computing device, ... ). For example, an over-the-air protocol can enable the WWAN device to change an output power class employed thereby via communicating over the air with base station 102. Thus, the network can yield permission for the WWAN device to adjust its output power class rather than allowing the WWAN device to unilaterally change a target transmit power employed thereby without cooperation from the network when attempting to alleviate an impact of thermal energy.

According to an example, the WWAN device itself can detect a temperature (e.g., ambient temperature, temperature of the WWAN device, temperature of the computing device, ... ). Additionally or alternatively, a thermal measurement device external to the WWAN device can detect the temperature and send a signal related to the detected temperature to the WWAN device (e.g., the computing device corresponding to the WWAN device can include a thermal measurement device to detect the temperature, a thermal measurement device that is separate from the WWAN device and corresponding computing device can be employed, ... ). Thus, for instance, when the thermal measurement device is separate from the WWAN device, a communications path from the thermal measurement device and/or the computing device to the WWAN device can be leveraged to transfer temperature related information to the WWAN device.

Moreover, the temperature measurement and/or the temperature related information supplied by the external source (e.g., the thermal measurement device, the computing device, ... ) can act as a trigger to enable the WWAN device to negotiate a different output power level with base station 102. For example, if the WWAN device recognizes that the temperature is above a threshold and/or is informed that the temperature is above the threshold, then the WWAN device can negotiate with base station 102 to lower the target transmit power level used by the WWAN device to communicate with base station 102. By way of further illustration, if the WWAN device recognizes that the temperature is below a threshold and/or is informed that the temperature is below the threshold, then the WWAN device can negotiate with base station 102 to raise the target transmit power level used by the WWAN device. Accordingly, closed loop control can be employed to alter the target transmit power level as a function of measured temperature.

Figure 2:
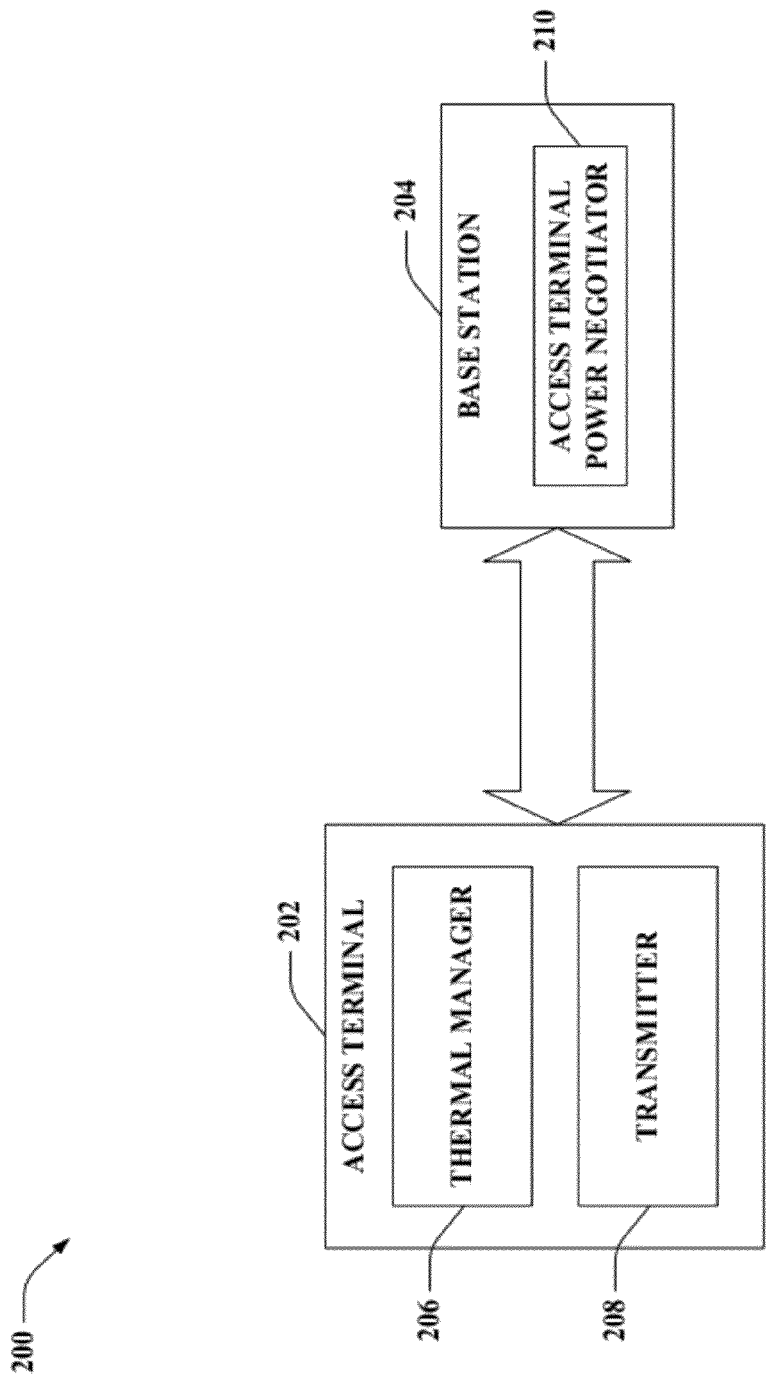
FIG. 2 is an illustration of an example system that throttles transmit power based upon thermal input in a wireless communication environment.

Now referring to FIG. 2, illustrated is a system 200 that throttles transmit power based upon thermal input in a wireless communication environment. System 200 includes an access terminal 202 that can transmit and/or receive information, signals, data, instructions, commands, bits, symbols, and the like. Access terminal 202 can communicate with a base station 204 via the forward link and/or reverse link. Base station 204 can transmit and/or receive information, signals, data, instructions, commands, bits, symbols, and the like. Moreover, although not shown, it is contemplated that any number of access terminals similar to access terminal 202 can be included in system 200 and/or any number of base stations similar to base station 204 can be included in system 200. Further, it is to be appreciated that access terminal 202 can be a WWAN device coupled with a computing device; however, the claimed subject matter is not so limited.

Access terminal 202 includes a thermal manager 206 and a transmitter 208. Thermal manager 206 can control target transmit power employed by transmitter 208 based at least in part upon thermal input. Further, thermal manager 206 can negotiate with an access terminal power negotiator 210 of base station 204 to select at least one of a target transmit power level, a class (e.g., power class, Multi Slot Class, ... ), a mode (e.g., type of technology, ... ), or frequency band to be employed when sending transmissions with transmitter 208. Thermal manager 206 can gradually adjust target transmit power (e.g., up or down) based upon considerations of temperature; in contrast, conventional techniques oftentimes manage temperature by inhibiting a data connection (e.g., stopping transmission of data, inhibiting operation of the WWAN device, ... ), which leads to significant performance degradation. Pursuant to an example, the term "target transmit power" can refer to a maximum transmit power that can be employed by transmitter 208 of access terminal 202 given a certain thermal condition; accordingly, transmitter 208 can send data at or below such maximum transmit power. However, it is contemplated that the term "target transmit power" is not limited to being a maximum transmit power; instead, the term "target transmit power" can refer to a minimum transmit power, an average transmit power, or any other transmit power.

As described herein, the terms "negotiation" and "negotiating" can involve access terminal 202 transmitting a message that signals a change in capabilities (e.g., adjustment in target transmit power level, class, mode, frequency band, ... ) to base station 204 and, in response, base station 204 can either ignore the message sent by access terminal 202 or acknowledge the message, which implies that the requested change has been granted. For example, negotiation by access terminal 202 can include sending a message that signals a change in capabilities to base station 204 and monitoring for an acknowledgement in response to the message that indicates that the change has been granted by base station 204; however, the claimed subject matter is not so limited.

Thermal manager 206 can include temperature measurement device(s) and/or receive temperature measurement information from substantially any type of temperature measurement device(s). Examples of a temperature measurement device that can be utilized in connection with thermal manager 206 include a thermometer, a thermistor, a resistance temperature detector (RTD), a pyrometer, and so forth; yet, it is to be appreciated that any type of temperature measurement device is intended to fall within the scope of the heretoappended claims.

Further, thermal manager 206 can provide intelligence that can detect a temperature, compare a temperature to a threshold, identify a target transmit power level, class (e.g., power class, Multi Slot Class, ... ), mode, band, etc. to be employed by transmitter 208, and/or communicate with access terminal power negotiator 210 of base station 204 to negotiate transitioning to the target transmit power level, class, mode, band, etc. Moreover, thermal manager 206 can continually monitor temperature to detect temperature changes due to adjustments in power level and/or changes in any environmental conditions. Accordingly, based upon the detected temperature changes, thermal manager 206 can identify and/or negotiate to transition to a disparate target transmit power level, class, mode, band, etc. Thus, a temperature measurement associated with access terminal 202 can be used to trigger a mechanism to adjust target transmit power used by transmitter 208 of access terminal 202 via cooperation with base station 204.

For example, if thermal manager 206 is included in a WWAN device, a temperature measuring algorithm (e.g., retained in firmware and/or software associated therewith, ...) can be employed to detect, analyze, and/or employ a temperature of the WWAN device itself, a temperature within a computing device (e.g., if the WWAN device is positioned within the computing device, ...), and the like. Additionally or alternatively, thermal manager 206 can obtain input(s) supplied from disparate source(s), where such input(s) can be yielded by implementing a temperature measuring algorithm included in software, firmware, etc. of the computing device, a disparate device, and/or the like. Hence, the temperature measuring algorithm can be included in a device driver, third party software, and so forth. It is to be appreciated, however, that the claimed subject matter is not limited to the aforementioned examples.

Moreover, thermal manager 206 can receive computing device supplied input(s) that can be used to trigger adjustment to a target transmit power level, class, mode, band, etc. For example, the computing device can use a device interface command such as an attention (AT) command, a Mobile Station Modem (MSM) Interface command, a diagnostic (Diag) command, or the like. By using such commands, the computing device can provide an instruction to the WWAN device (e.g., thermal manager 206 of the WWAN device, ...) that a temperature associated with the computing device is above a threshold (e.g., the computing device is too hot, ...). Thereafter, the WWAN device (e.g. via employing thermal manager 206, ...) can use protocol mechanisms (e.g., from 3GPP, ...) to reduce the output power, thereby lowering the amount of heat emitted by the WWAN device, for instance.

The following illustrates an example that can be implemented utilizing thermal manager 206 of a WWAN device. A computing device can instruct the WWAN device that it is too hot. Thereafter, the WWAN device can dynamically lower its class. Further, the WWAN device can inform the network of the change with a UE CAPABILITY INFORMATION command. Moreover, the WWAN device can receive TRANSPORT FORMAT COMBINATION CONTROL commands that enable lower data rates to be selected from the lower class. Lower data rates can correlate to reduced output power/thermal power. In a similar fashion, the computing device can instruct the WWAN device that is has reach a sufficiently cool temperature. Thus, the WWAN device can dynamically change its class. The WWAN device can inform the network of the change with the UE CAPABILITY INFORMATION command. Moreover, the WWAN device can receive TRANSPORT FORMAT COMBINATION CONTROL commands that enable higher data rates to be selected from the higher class. Additionally, the WWAN device can perform hysteresis to avoid excessive throttling between classes. Accordingly, the thermal energy reduced by the WWAN device can be lowered, thereby enabling the computing device to function better. Moreover, the mechanism can use existing standard over-the-air mechanisms; however, the claimed subject matter is not so limited.

Figure 3:
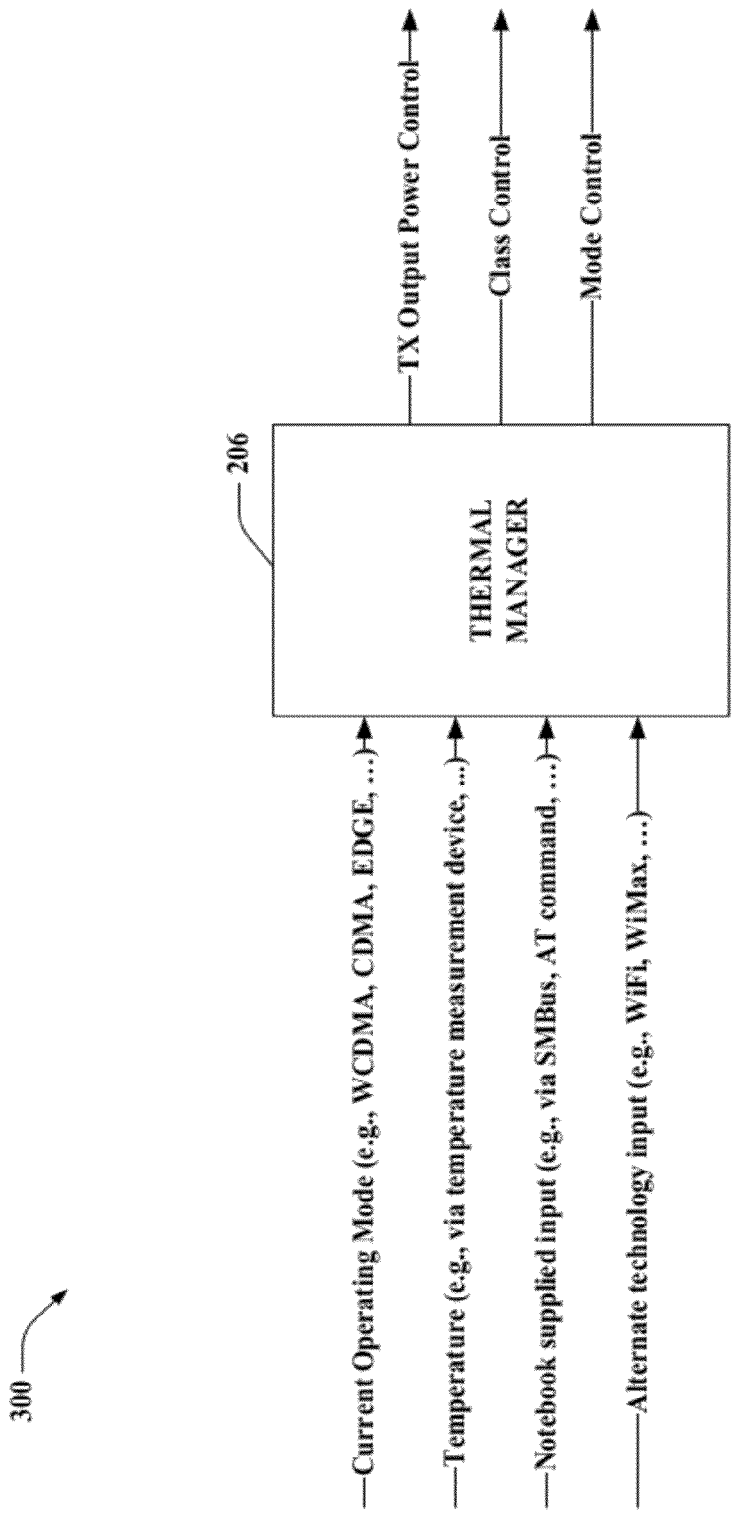
FIG. 3 is an illustration of an example block diagram that depicts input(s) and output(s) of a thermal manager utilized in connection with a WWAN device in a wireless communication environment.

Now referring to FIG. 3, illustrated is a block diagram 300 that depicts input(s) and output(s) of a thermal manager 206 utilized in connection with a WWAN device in a wireless communication environment. For instance, thermal manager 206 can be included within the WWAN device; however, it is to be appreciated that at least a portion of thermal manager 206 can be separate from the WWAN device. The following provides an illustration of example inputs that can be provided to thermal manager 206 and example outputs that can be yielded from thermal manager 206. It is to be appreciated that a subset of such inputs and/or outputs described herein can be leverage in connection with thermal manager 206. Moreover, it is contemplated that disparate input(s) and/or output(s) other than those illustrated can be utilized in conjunction with thermal manager 206, and are intended to fall within the scope of the claimed subject matter.

Various inputs can be provided to thermal manager 206. For instance, a temperature can be inputted to thermal manager 206. The temperature can be gauged by a device such as a thermometer, a thermistor, a resistance temperature detector (RTD), a pyrometer, or a similar type of device that can measure temperature.

According to another illustration, a current operating mode can be inputted to thermal manager 206. Examples of operating modes can be Wideband Code Division Multiple Access (WCDMA), Code Division Multiple Access (CDMA), Enhanced Data rates for GSM Evolution (EDGE), CDMA2000, General Packet Radio Service (GPRS), and so forth. However, the claimed subject matter is not limited to these example operating modes.

Pursuant to another example, notebook (e.g., computing device) supplied input can be provided to thermal manager 206. The WWAN device, which includes thermal manager 206, and the computing device (e.g., notebook computer, ...) can have a communication path there between. For instance, a System Management Bus (SMBus) can be used by the computing device to send notebook supplied input to the WWAN device. The SMBus can be a bus that includes dedicated pins on the WWAN device. Additionally or alternatively, a Universal Serial Bus (USB) can be employed to transfer notebook supplied input to the WWAN device. Moreover, it is contemplated that any disparate type of connection (e.g. wired and/or wireless) can be used between the computing device and the WWAN device. The notebook supplied input provided by the computing device can use a device interface command such as an AT command, a MSM Interface command, a Diag command, or the like. According to an illustration, the computing device can measure temperature and/or recognize whether the measured temperature exceeds a threshold. Further, the computing device can determine that the WWAN device is a significant contributor to the overheating, and thus, can transmit the notebook supplied input to the WWAN device to request modified behavior that can cause reduction in thermal output.

By way of a further example, thermal manager 206 can obtain an alternate technology input. For instance, a disparate module (e.g., associated with the computing device, ...) that employs a disparate type of technology can send an input to thermal manager 206 that requests the WWAN device to lower its thermal output when such module is being negatively impacted (e.g., due to the temperature, ...). The disparate type of technology utilized by the disparate module can be, for example, WiFi, WiMax, etc. It is contemplated that the WWAN device and the disparate module can be incorporated into a common card and/or on disparate cards (e.g., cards associated with the WWAN device and the disparate module can be in proximity to each other, ...).

Thermal manager 206 can yield one or more outputs that can affect the thermal output corresponding to the WWAN device. The outputs can include transmit (TX) output power control, class control and mode control. The TX output power control can change the power of the signal that is produced over the air. For instance, a mechanism for reducing the thermal power that the WWAN device yields can be to reduce an amount of radiant transmit power that the WWAN device outputs. Moreover, the class control can be a negotiation mechanism that can be leveraged with the network (e.g., via access terminal power negotiator 204 of FIG. 2, . . . ) to permit the WWAN device to alter its class, which can lead to reducing outputted thermal power. Further, the mode control can be a negotiation mechanism that can be utilized to switch between operating modes. For instance, each operating mode can have different thermal characteristics; thus, changing the operating mode utilized by the WWAN device can result in altering the outputted thermal power.

Figure 4:
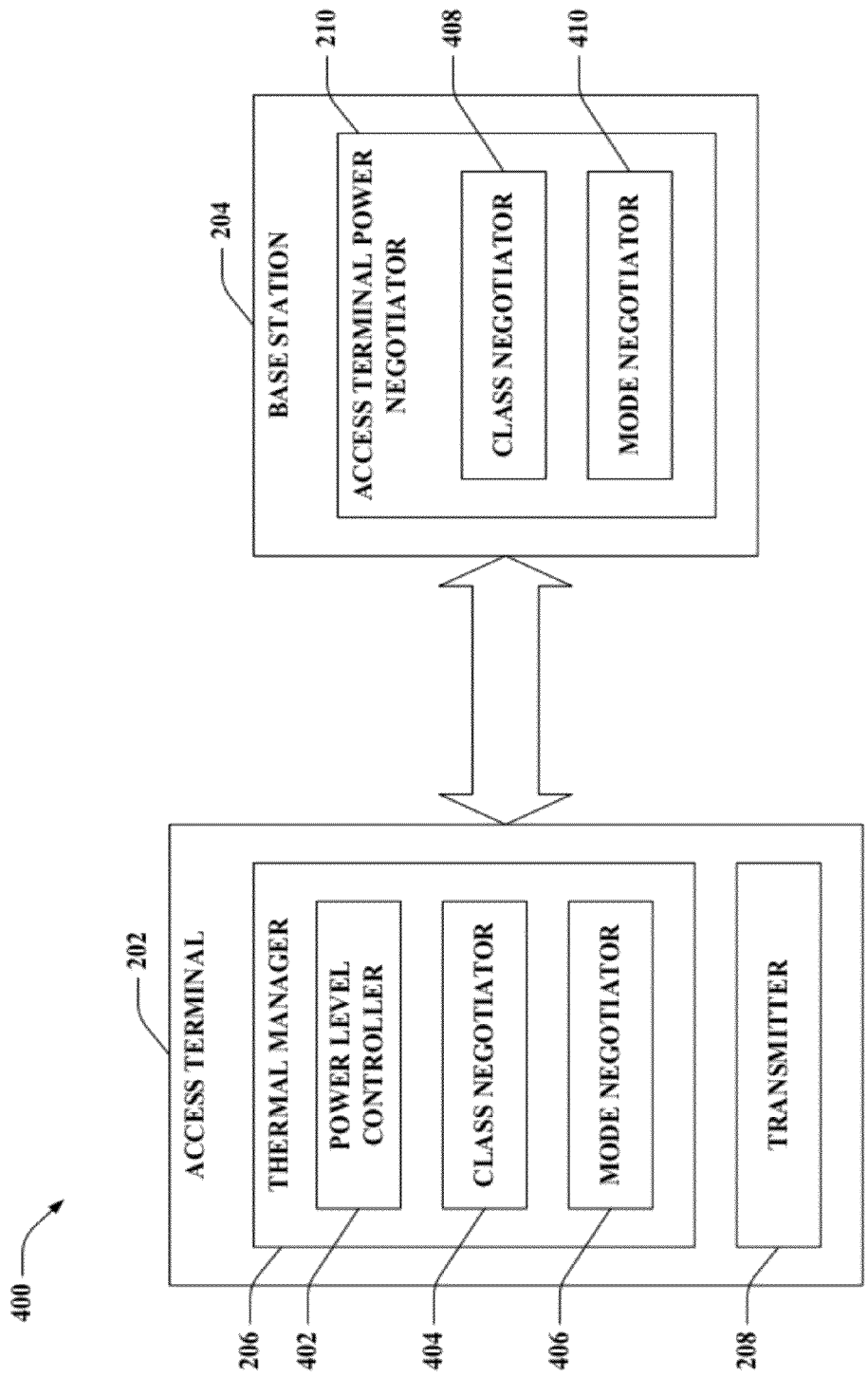
FIG. 4 is an illustration of an example system that coordinates throttling of access terminal transmit power in a wireless communication environment.

Turning to FIG. 4, illustrated is a system 400 that coordinates throttling of access terminal transmit power in a wireless communication environment. System 400 includes access terminal 202 and base station 204. Access terminal 202 can include thermal manager 206 and transmitter 208, and base station 204 can include access terminal power negotiator 210.

Thermal manager 206 can further include a power level controller 402, a class negotiator 404, and a mode negotiator 406. Power level controller 402 can determine a target transmit power to be utilized by transmitter 208 when a WWAN module is initiated and transmitter 208 is activated. Moreover, power level controller 402 can yield a transmit output power control signal that can be provided to transmitter 208 to manage the target transmit power level. Temperature can increase as the WWAN module utilizes transmitter 208 to send transmissions at or below a given target transmit power. Accordingly, thermal manager 206 can track the temperature associated with the WWAN module (e.g., by utilizing a temperature detecting sensor, . . . ) to determine, for instance, whether the temperature has risen to a level that violates a specification (e.g., outside of an operating range set forth for the WWAN module, component(s) of an associated computing device, . . . ), reduces performance of the WWAN module in a manner that violates a standard, or the like. Thus, when thermal manager 206 recognizes that the temperature is above a threshold, power level controller 402 can lower the target transmit power allowed for use by transmitter 208. By way of illustration, power level controller 402 can lower the target transmit power by Y dB utilizing a linear scale, where Y can be a real number; thus, when the temperature is above the threshold, power level controller 402 can decrease the target transmit power nearly linearly as a function of the temperature increase above the threshold. Power level controller 402 can decrease the target transmit power within a range corresponding to a power class allocated to access terminal 202, where the power class can specify a minimum transmit power (and/or a maximum transmit power) that can be utilized by access terminal 202 for such power class. A standard can set the minimum transmit power (and/or the maximum transmit power) that can be used for a power class. For example, the minimum transmit power in a given power class in CDMA can be 23 dBm; thus, if power level controller 402 determines that the target transmit power should be below 23 dBm while in this given power class, then the power class can be changed (e.g., utilizing class negotiator 404 as further described below, . . . ) to remain standard compliant. Alternatively, if power level controller 402 identifies a target transmit power to be utilized that is above 23 dBm while in this given power class, then the power class need not be altered. Moreover, power level controller 402 can increase the target transmit power within the range corresponding to the allocated power class as the temperature decreases. Accordingly, the terms "maximum transmit power" and "minimum transmit power" can refer to a maximum or minimum power level that can be used by access terminal 202 while employing a given power class. Further, the term "target transmit power" can be a power level chosen by power level controller 402 for utilization in connection with access terminal 202 based upon a certain thermal condition. For instance, power level controller 402 can select a target transmit power that falls within a range defined by a maximum transmit power and a minimum transmit power for a particular power class used by access terminal 202.

Once a power class threshold is reached (e.g., power level controller 402 selects a target transmit power level that is outside of a range associated with the given power class, . . . ), class negotiator 404 and/or mode negotiator 406 can negotiate with base station 204 (e.g., access terminal power negotiator 210, . . . ) to alter the class and/or mode, respectively. More particularly, access terminal power negotiator 210 of base station 204 can further include a class negotiator 408 and a mode negotiator 410. Thus, class negotiator 404 of access terminal 202 and class negotiator 408 of base station 204 can cooperate to select an appropriate class for access terminal 202 to employ. It is to be appreciated that the class selected by class negotiator 404 and class negotiator 408 can be a power class, a Multi Slot Class, or the like for utilization by access terminal 202; accordingly, the term "class" as utilized herein can refer to a power class, a Multi Slot Class, a combination of power class and Multi Slot Class, or any disparate type of class. Moreover, mode negotiator 406 of access terminal 202 and mode negotiator 410 of base station can coordination choosing an appropriate mode for use by access terminal 202.

For example, when power level controller 402 identifies a target transmit power level to be utilized which is below the range associated with the power class allocated to access terminal 202, class negotiator 404 can cooperate with base station 204 (e.g., class negotiator 408, . . . ) to switch to a lower power class. Class negotiators 404 and 408 can decide upon a power class for utilization by access terminal 202 while employing CDMA or WCDMA, for example. Hence, pursuant to the example where a given CDMA class can allow a minimum transmit power of 23 dBm, when power level controller 402 determines that the target transmit power level should be below 23 dBm, mode negotiators 404 and 408 can communicate to transition access terminal 202 to a lower power class (e.g. with a lower corresponding minimum transmit power permitted, . . . ). By way of another example, class negotiators 404 and 408 can cooperatively transition between Multi Slot Classes for use by access terminal 202 (e.g., based upon target transmit power levels identified by power level controller 402, . . . ). Multi Slot Classes can be utilized in connection with GSM, GPRS, EDGE, and so forth. For instance, the Multi Slot Class can specify a number of slots that can be used by access terminal 202 for transmission; the number of slots used for transmission and the heat dissipated can be directly correlated. Thus, when the temperature is determined to be too high, the number of slots used for transmission can be decreased (e.g., from 4 to 2, from 2 to 1, . . . ) by class negotiators 404 and 408 selecting a disparate Multi Slot Class for employment by access terminal 202.

Moreover, mode negotiators 406 and 410 can cooperatively select a mode for utilization by access terminal 202. For instance, there can be a lower limit in terms of power class that can be chosen by class negotiators 404 and 408 (e.g., 1 slot when employing GPRS, reasonable power class for WCDMA or CDMA, . . . ), and, upon reaching that lower limited, mode negotiators 406 and 410 can switch modes for use by access terminal 202. When this lower limit is reached, mode negotiators 406 and 410 can change the mode, for example, from WCDMA (or CDMA) to EDGE; it is to be appreciated that any change in mode can be utilized by mode negotiators 406 and 410 depending upon thermal impact of such modes (e.g. EDGE can have a lower thermal impact as compared to WCDMA or CDMA, . . . ). Moreover transitioning of modes can include switching between utilization of different components of access terminal 202; thus, a first component that was previously hot can be switched off, while a second component that was previously off can be turned on, thereby allowing the first component to cool down.

Thermal manager 206 can also receive external inputs (e.g., from the associated computing device, from alternate technology modules, . . . ) that can initiate changing the power level, class and/or mode. Alterations by power level controller 402, class negotiator 404 and/or mode negotiator 406 as described above can be yielded when thermal manager 206 obtains these external inputs. Thus, such changes can result from the external inputs provided to thermal manager 206 and/or temperature measurements collected by thermal manager 206.

An example of an external input is a computing device supplied request (e.g., notebook request, . . . ). For instance, heat sensitive component(s) of the computing device can be positioned underneath the WWAN module and the computing device can monitor temperature of these component(s); if the temperature of such component(s) is recognized as being too high, then the computing device can send a request to thermal manager 206 (e.g., via SMBus, AT command, any communication channel, . . . ) noting the temperature, indicating that the temperature is too high and/or requesting that the target transmit power of the WWAN module be reduced. Accordingly, power level controller 402, class negotiator 404, and/or mode negotiator 406 can alter the power level, class and/or mode in response as described above.

In accordance with another illustration, an alternate technology module (e.g., WiFi module, WiMax module, . . . ) can supply an input to thermal manager 206 that can be leveraged to adjust the power level, class, and/or mode. For instance, a WiFi or WiMax module can share a physical card with the WWAN module. Additionally or alternatively, the WiFi or WiMax module and WWAN module can be on disparate physical cards that are within proximity of one another. The WWAN module and the alternate technology module can both generate heat. Further, a communication path between these modules can be leveraged to communicate information about temperature, target transmit power, and so forth there between. Hence, thermal manager 402 can compensate for heat being yielded from the WWAN module as well as the alternate technology module (e.g., which can be identified based upon received information from the alternate technology module, . . . ).

Figure 5:
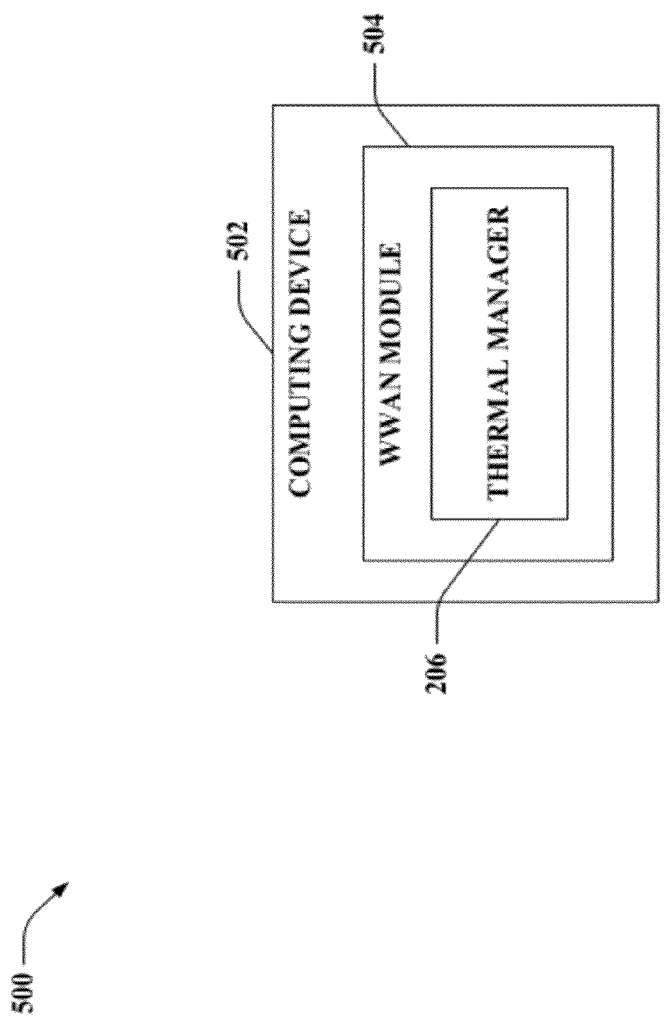
FIG. 5 is an illustration of an example system that depicts a configuration that can be employed in connection with the claimed subject matter.

Now referring to FIG. 5, illustrated is an example system 500 that depicts a configuration that can be employed in connection with the claimed subject matter. It is to be appreciated, however, that the claimed subject matter is not limited to this example configuration. System 500 includes a computing device 502 (e.g., notebook computer, . . . ), a WWAN module 504 and thermal manager 206 as described herein. As shown, computing device 502 can include WWAN module 504 (e.g., WWAN module 504 can be part of computing device 502, . . . ), which can further include thermal manager 206 (e.g., thermal manager 206 can be part of WWAN module 504, . . . ). According to this example, WWAN module 504 can be incorporated directly into a socket that resides on a motherboard of computing device 502, for instance. Alternatively, WWAN module 504 can be removeably connectable with computing device 502 (e.g., WWAN module 504 can have an express card form factor, WWAN module 504 can be coupled to computing device 502, . . . ). It is contemplated that any disparate configuration that differs from the configuration shown in FIG. 5 can alternatively be leveraged (e.g., WWAN module 504 can be at least partially separate from computing device 502, thermal manager 206 can be at least partially separate from WWAN module 504, thermal manager 206 can be coupled to WWAN module 504, . . . ).

Figure 6:
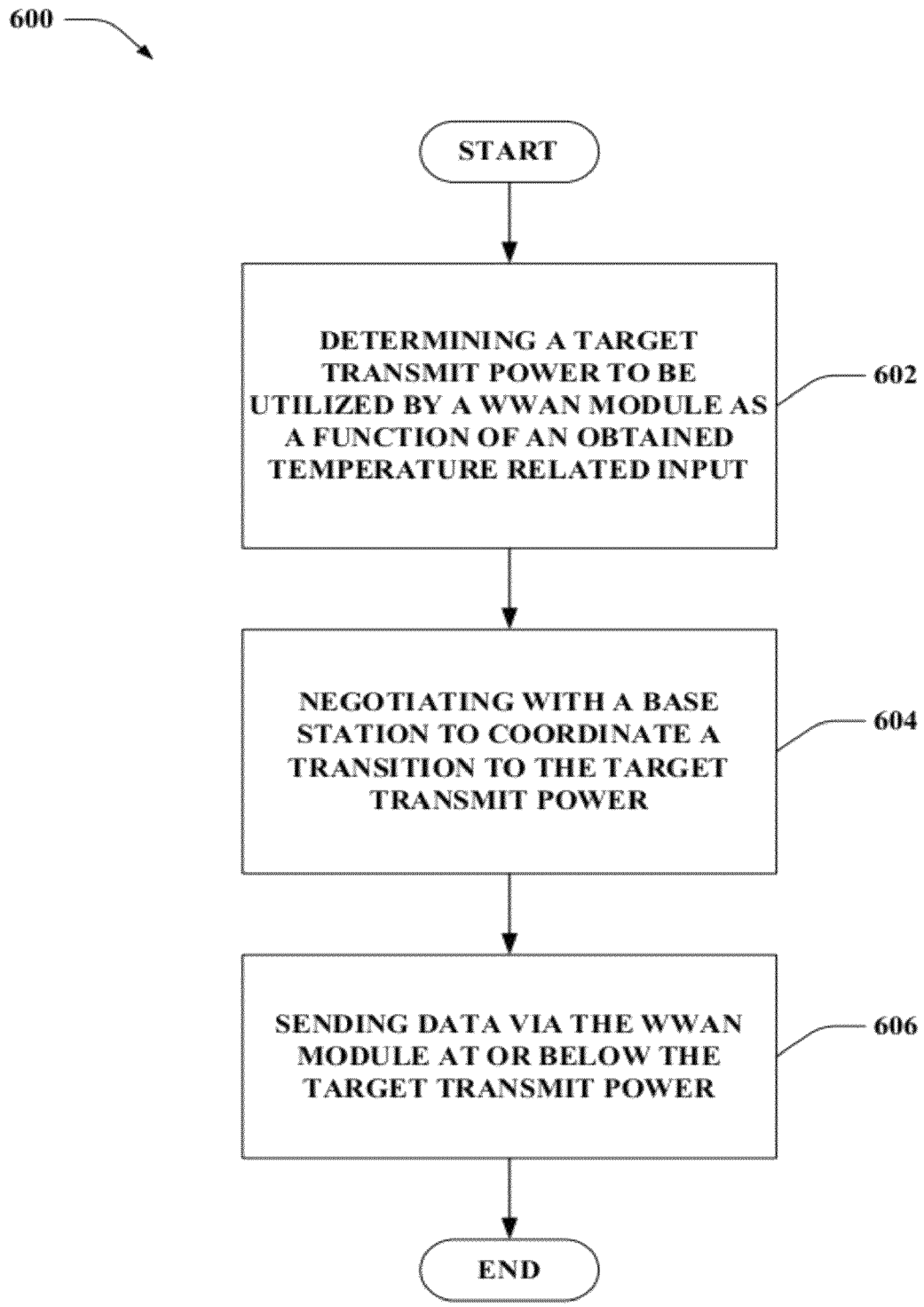
FIG. 6 is an illustration of an example methodology that facilitates throttling transmit power of a WWAN module in a wireless communication environment.
Figure 7:
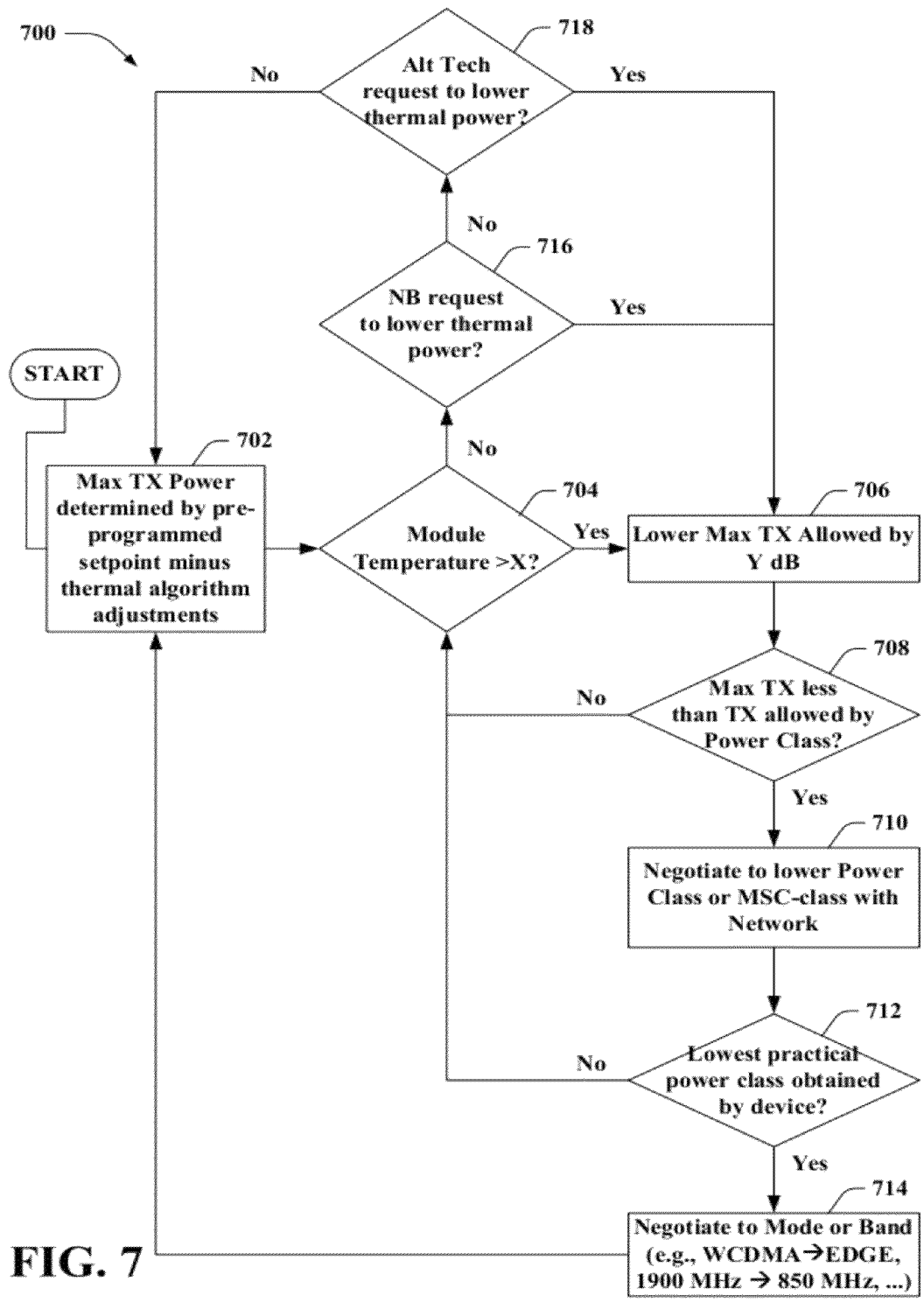
FIG. 7 is an illustration of an example methodology that facilitates gradually altering transmit power of a WWAN module in a wireless communication environment.
Figure 8:
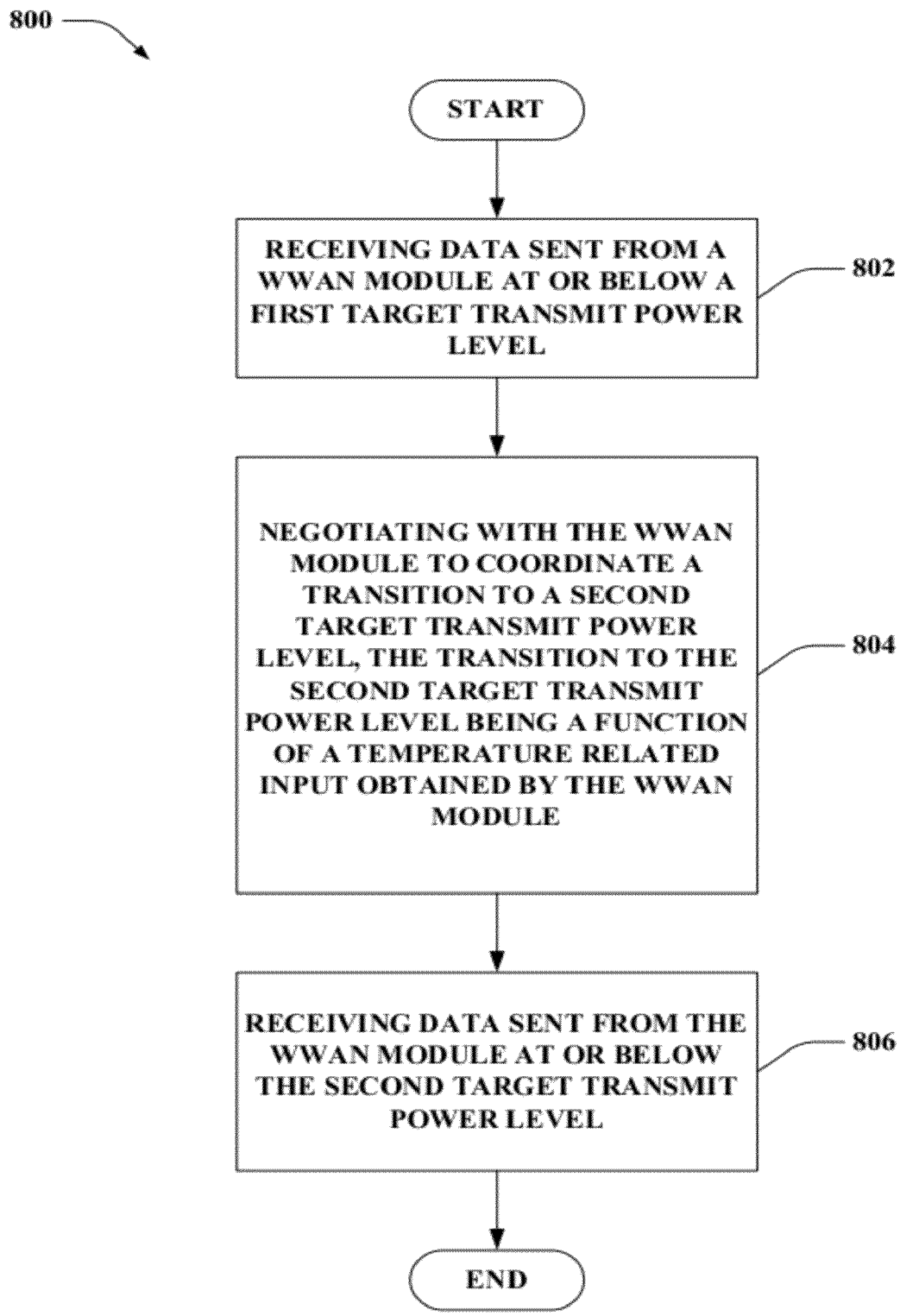
FIG. 8 is an illustration of an example methodology that facilitates coordinating WWAN module transmit power alterations based upon thermal input in a wireless communication environment.

Referring to FIGS. 6-8, methodologies relating to throttling transmit power in a WWAN device based upon thermal input in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 that facilitates throttling transmit power of a WWAN module in a wireless communication environment. At 602, a target transmit power to be utilized by a WWAN module can be determined as a function of an obtained temperature related input. For instance, the temperature related input can be at least one of a detected temperature or a temperature related input from an external source. The WWAN module can be included in a computing device (e.g., notebook computer, . . . ), removeably connectable to the computing device, or the like. The WWAN module can employ a transmit power equal to or less than the target transmit power for sending data, and the target transmit power can be chosen to account for thermal conditions experienced while the target transmit power is utilized. Moreover, the target transmit power can be selected based upon an amount that the detected temperature is above a threshold temperature. By way of another example, when the detected temperature is recognized to be greater than the threshold temperature, then the target transmit power can be lowered by a predetermined amount. Thereafter, the temperature can be measured again, compared to the threshold temperature, and the target transmit power can be lowered by the predetermined amount if the temperature remains above the threshold temperature; the aforementioned can be further repeated until the measured temperature falls below the threshold temperature. Additionally, the external source can be the computing device, an alternative technology module (e.g., WiFi module, WiMax module, . . . ), etc. Thus, the external source can provide the temperature related input, which can include a request to lower the target transmit power, a temperature measurement yielded by the external source, or the like.

At 604, negotiations with a base station can be effectuated to coordinate a transition to the target transmit power. For example, a class (e.g. power class and/or Multi Slot Class, . . . ) can be negotiated with the base station. Following this example, if the target transmit power falls outside of a range associated with a given class (e.g., given power class or Multi Slot Class, . . . ) allocated to the WWAN module, then a disparate class (e.g., disparate power class or Multi Slot Class, . . . ) can be cooperatively selected for the WWAN module via negotiation with the base station. By way of illustration, if the target transmit power is less than a minimum transmit power as specified by an allocated class, then a lower class can be selected for the WWAN module through negotiation with the base station. Similarly, if the target transmit power is greater than a maximum transmit power as set forth by the allocated class, then a higher class can be cooperatively chosen for the WWAN module via negotiation. Moreover, an operating mode can be chosen for employment by the WWAN module via negotiation with the base station. Examples of operating modes can be Wideband Code Division Multiple Access (WCDMA), Code Division Multiple Access (CDMA), Enhanced Data rates for GSM Evolution (EDGE), CDMA2000, General Packet Radio Service (GPRS), and so forth; however, the claimed subject matter is not limited to these example operating modes. According to an example, operating mode negotiation can be effectuated upon determining that a lowest practical class has been allocated to the WWAN module. Each of the operating modes can have corresponding thermal characteristics; thus, to reduce temperature, negotiation with the base station can lead to selecting to transition from WCDMA or CDMA to EDGE; yet, the claimed subject matter is not so limited.

At 606, data can be sent via the WWAN module at or below the target transmit power. For example, data can be sent below the target transmit power when the WWAN module is located within close proximity of the base station, while data can be sent at the target transmit power when the WWAN module is located at an edge of a cell associated with the base station. Moreover, when class and/or operating mode negotiations are effectuated, the data can be sent by the WWAN module by leveraging the cooperatively selected class (power class or Multi Slot Class) and/or operating mode. Further, although not shown, it is contemplated that the target transmit power can be dynamically updated over time (e.g., increased or decreased), leading to sending the data via the WWAN module utilizing the dynamically updated target transmit power, dynamically updated class and/or dynamically updated operating mode.

Now turning to FIG. 7, illustrated is a methodology 700 that facilitates gradually altering transmit power of a WWAN module in a wireless communication environment. At 702, a maximum transmit power can be determined by a pre-programmed setpoint minus thermal adjustments. At 704, a temperature detected by a WWAN module can be compared to a threshold (e.g., X, where X can be a real number, . . . ). If the temperature is above the threshold, then the methodology 700 continues to 706. At 706, the maximum transmit power allowed can be reduced by Y dB (where Y is a real number). According to an example, Y can be predetermined, adaptively adjusted, etc. At 708, the maximum transmit power can be compared to a transmit power allowed by a power class allocated to the WWAN module. If the maximum transmit power is greater than the transmit power allowed by the power class, then the methodology 700 returns to 704. If the maximum transmit power is less than the transmit power allowed by the power class, then the methodology 700 continues to 710. At 710, a lower power class or Multi Slot Class can be negotiated with a network. At 712, a determination can be effectuated as to whether the power class obtained by the device (e.g., WWAN module, . . . ) is the lowest practical. If the power class obtained by the device is not the lowest practical power class, then the methodology 700 returns to 704. If the power class obtained by the device is the lowest practical power class, then the methodology 700 continues to 714. At 714, a disparate mode or band can be negotiated. By way of example, an operating mode can be changed from WCDMA to EDGE; however, the claimed subject matter is not so limited. According to another illustration, a band can be changed to switch from employing a first component to a second component (e.g., if current operation is effectuated in the Personal Communications Service (PCS) band, a switch can be made to the Cell band to reduce temperature since a transition is made from a component that was on prior to the switch to a component that was off prior to the switch, . . . ). Following this illustration, the band can be changed from 1900 MHz to 850 MHz, for example; however, the claimed subject matter is not so limited. From 714, the methodology 700 can return to 702.

At 704, if the temperature detected by the WWAN module is below the threshold, then the methodology 700 can continue to 716. At 716, an evaluation concerning whether a notebook request to lower thermal power has been obtained can be effectuated. If a notebook request to lower thermal power has been received, then the methodology 700 can continue to 706 to lower the maximum transmit power allowed by Y dB. Otherwise, if a notebook request to lower thermal power has not been received, then the methodology 700 can continue to 718. At 718, it can be determined whether an alternate technology request to lower thermal power has been received. If an alternate technology request to lower thermal power has been received, then the methodology 700 can continue to 706 to lower the maximum transmit power allowed by Y dB. Alternatively, if an alternate technology request to lower thermal power has not been received, then the methodology 700 returns to 702.

Referring to FIG. 8, illustrated is a methodology 800 that facilitates coordinating WWAN module transmit power alterations based upon thermal input in a wireless communication environment. At 802, data sent from a WWAN module at or below a first target transmit power level can be received. At 804, negotiation with the WWAN module to coordinate a transition to a second target transmit power level can be effectuated. For example, the transition to the second target transmit power level can be a function of a temperature related input obtained by the WWAN module. According to an illustration, the temperature related input obtained by the WWAN module can be at least one of a temperature at the WWAN module or a temperature related external input obtained by the WWAN module. Further, a class (e.g., power class and/or Multi Slot Class, . . . ) can be cooperatively selected together with the WWAN module via the negotiation. By way of illustration, if the second target transmit power is lower than a transmit power allowed by a first class allotted to the WWAN module, then a lower, second class can be selected for the WWAN module. Moreover, an operating mode can be cooperatively chosen with the WWAN module via the negotiation. For instance, if a class chosen for the WWAN module through negotiation is not practical while employing a first operating mode, then a second operating mode can be selected for the WWAN module. At 806, data sent from the WWAN module at or below the second target transmit power level can be received subsequent to the transition. Further, the WWAN module can employ the second class and/or second operating mode cooperatively identified through negotiation with the WWAN module.

It will be appreciated that, in accordance with one or more aspects described herein, inferences can be made regarding throttling transmit power in a WWAN module based upon thermal input in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining a temperature, change in temperature, temperature trend data, and so forth. By way of further illustration, an inference can be made related to determining an anticipated impact of a transmit power change upon heat dissipation, WWAN performance, performance of disparate component(s) (e.g., component(s) of a computing device associated with the WWAN, . . . ), and the like. It will be appreciated that the foregoing examples are illustrative in nature and are not intended to limit the number of inferences that can be made or the manner in which such inferences are made in conjunction with the various embodiments and/or methods described herein.

Figure 9:
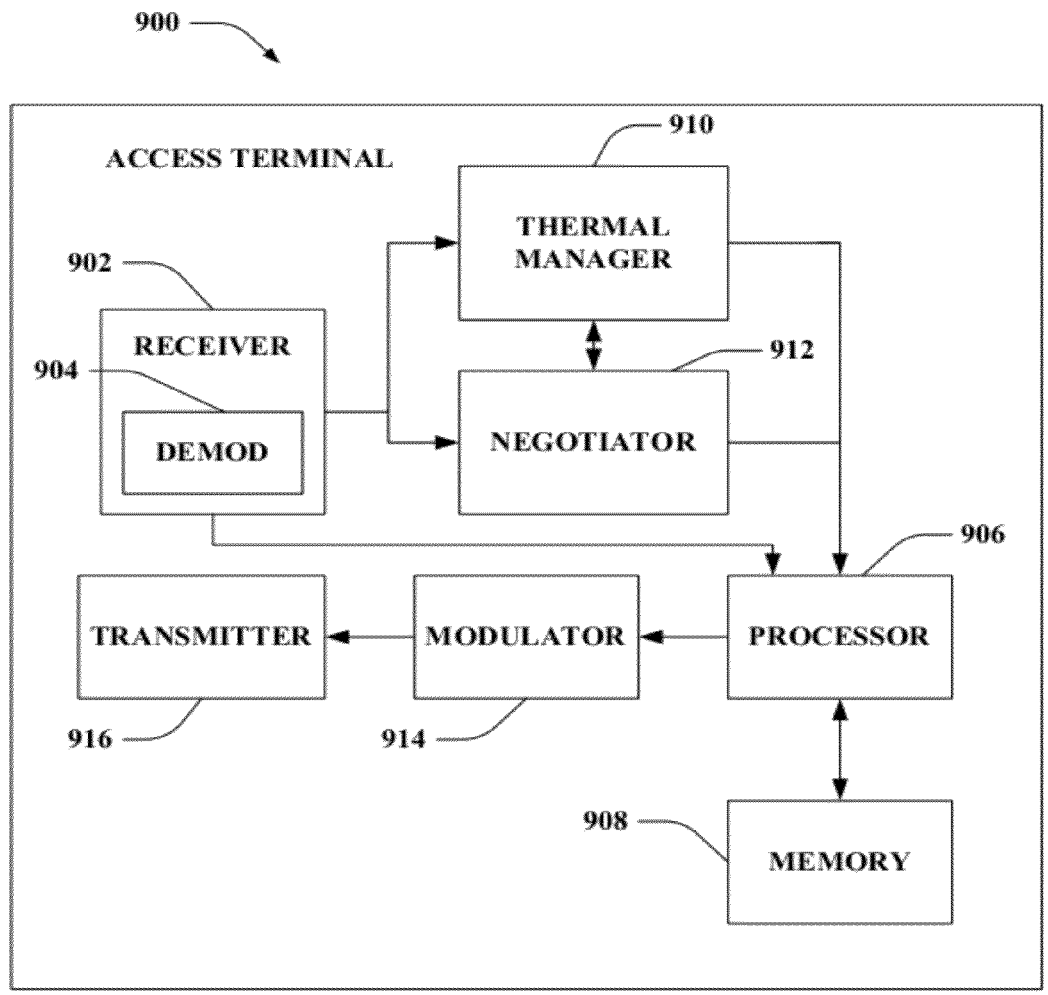
FIG. 9 is an illustration of an example access terminal that employs transmit power throttling based upon thermal conditions in a wireless communication system.

FIG. 9 is an illustration of an access terminal 900 that employs transmit power throttling based upon thermal conditions in a wireless communication system. Access terminal 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 916, a processor that controls one or more components of access terminal 900, and/or a processor that both analyzes information received by receiver 902, generates information for transmission by transmitter 916, and controls one or more components of access terminal 900.

Access terminal 900 can additionally comprise memory 908 that is operatively coupled to processor 906 and that can store data to be transmitted, received data, and any other suitable information related to performing the various actions and functions set forth herein. Memory 908 can additionally store protocols and/or algorithms associated with selecting transmit power levels to employ for transmissions based upon thermal related inputs, negotiating changes corresponding to transmit power, class and/or operating mode with a base station, and so forth.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Receiver 902 is further operatively coupled to a thermal manager 910 and/or a negotiator 912. Thermal manager 910 can obtain various temperature related inputs and can evaluate such inputs in connection with selecting a target transmit power to be employed by access terminal 900. For example, the temperature related input can be a temperature measured by one or more temperature sensors, an input corresponding to thermal conditions received from an external source (e.g., a computing device, an alternate technology module, . . . ), and so forth. Moreover, thermal manager 910 can analyze the various inputs to determine a target transmit power to be used for transmission, where selection of the target transmit power can mitigate a deleterious impact corresponding to the detected thermal conditions. Further, negotiator 912 can cooperatively select a class and/or operating mode to be used by access terminal 900 in connection with operating with the target transmit power. It is contemplated that thermal manager 910 can be substantially similar to thermal manager 206 of FIG. 2. Moreover, it is to be appreciated that negotiator 912 can be substantially similar to class negotiator 404 and/or mode negotiator 406 of FIG. 4. Although not shown, it is also to be appreciated that thermal manager 910 can include negotiator 912 (and/or a power level controller substantially similar to power level controller 402 of FIG. 4). Access terminal 900 still further comprises a modulator 914 and a transmitter 916 that transmits the signal to, for instance, a base station, another access terminal, etc. Although depicted as being separate from the processor 906, it is to be appreciated that thermal manager 910, negotiator 912 and/or modulator 914 can be part of processor 906 or a number of processors (not shown).

Figure 10:
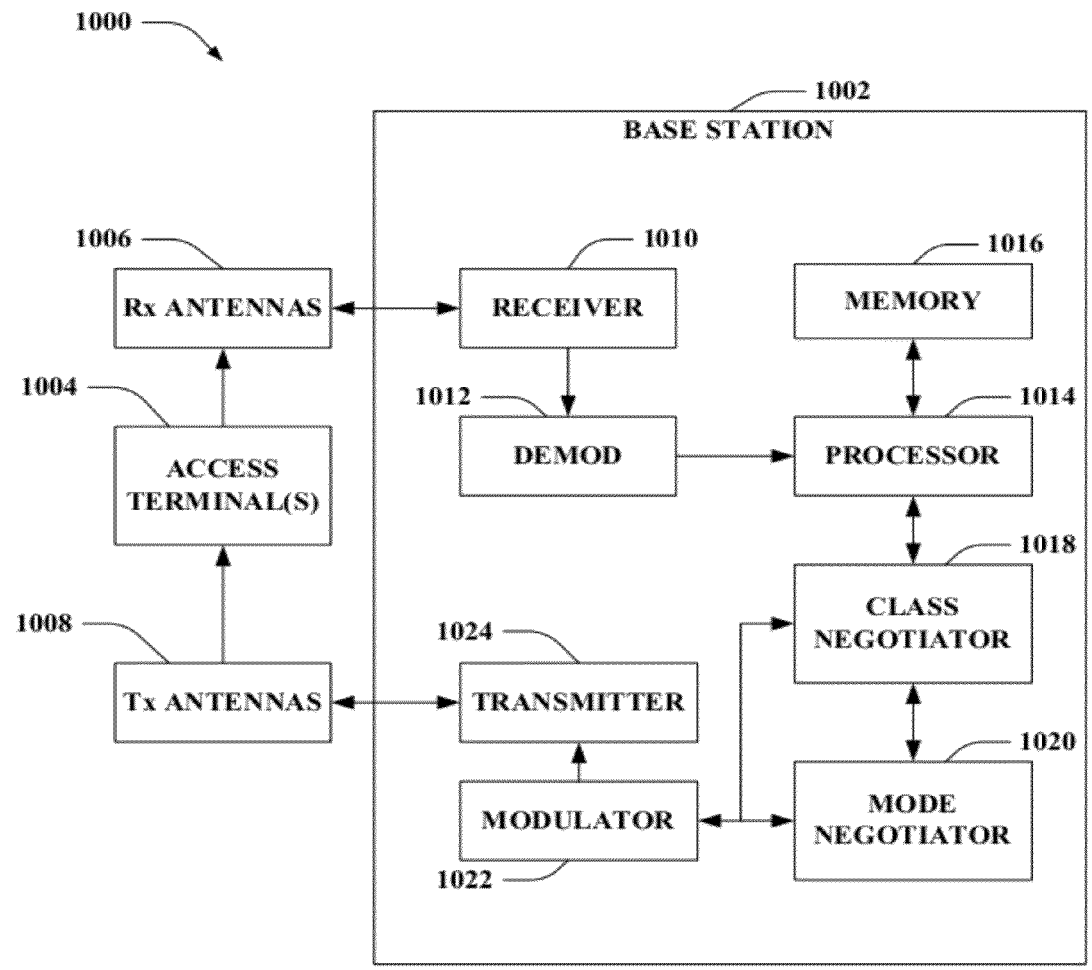
FIG. 10 is an illustration of an example system that coordinates changes in power class and/or operating mode of an access terminal based upon thermal input in a wireless communication environment.

FIG. 10 is an illustration of a system 1000 that coordinates changes in power class and/or operating mode of an access terminal based upon thermal input in a wireless communication environment. System 1000 comprises a base station 1002 (e.g., access point, . . . ) with a receiver 1010 that receives signal(s) from one or more access terminals 1004 through a plurality of receive antennas 1006, and a transmitter 1024 that transmits to the one or more access terminals 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores data to be transmitted to or received from access terminal(s) 1004 (or a disparate base station (not shown)) and/or any other suitable information related to performing the various actions and functions set forth herein. For instance, memory 1016 can include instructions related to cooperatively selecting class and/or operating mode for use by access terminal(s) 1004 as described herein. Processor 1014 is further coupled to a class negotiator 1018 that can coordinate selection of class(es) for use by access terminal(s) 1004. For instance, when an access terminal intends to transmit at a power level outside of a range specified for a class allocated to such access terminal, class negotiator 1018 can coordinate choosing an appropriate, disparate class with a range that includes the intended transmit power level. Class negotiator 1018 can be operatively coupled to a mode negotiator 1020 that coordinates selection of an operating mode for access terminal(s) 1004 as described herein. It is contemplated that class negotiator 1018 can be substantially similar to class negotiator 408 of FIG. 4 and/or mode negotiator 1020 can be substantially similar to mode negotiator 410 of FIG. 4. Base station 1002 can further include a modulator 1022, which can multiplex a frame for transmission by a transmitter 1024 through antennas 1008 to access terminal(s) 1004. Although depicted as being separate from the processor 1014, it is to be appreciated that class negotiator 1018, mode negotiator 1020 and/or modulator 1022 can be part of processor 1014 or a number of processors (not shown).

Figure 11:
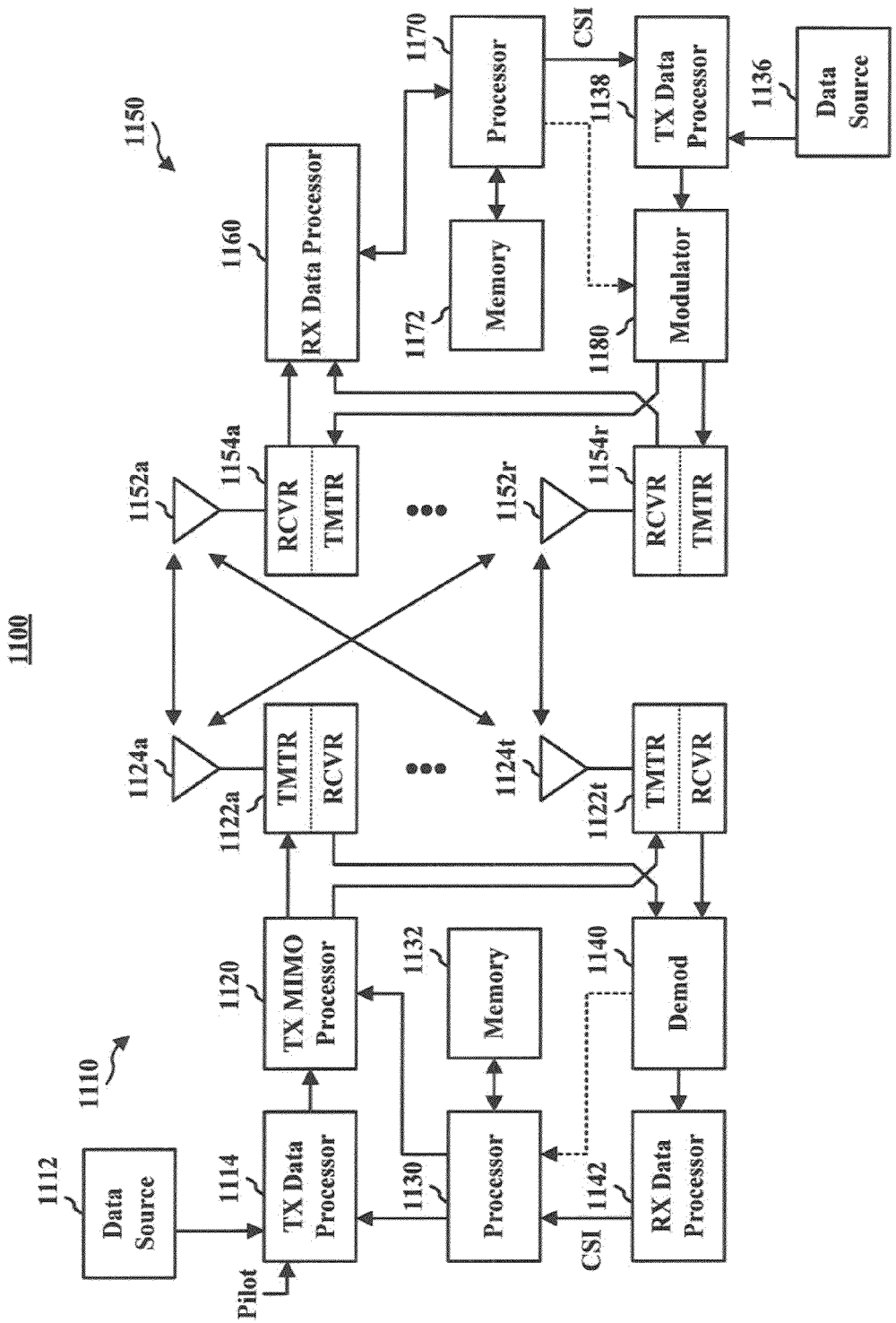
FIG. 11 is an illustration of an example wireless network environment that can be employed in conjunction with the various systems and methods described herein.

FIG. 11 shows an example wireless communication system 1100. The wireless communication system 1100 depicts one base station 1110 and one access terminal 1150 for sake of brevity. However, it is to be appreciated that system 1100 can include more than one base station and/or more than one access terminal, wherein additional base stations and/or access terminals can be substantially similar or different from example base station 1110 and access terminal 1150 described below. In addition, it is to be appreciated that base station 1110 and/or access terminal 1150 can employ the systems (FIGS. 1-5, 9-10, and 12-13) and/or methods (FIGS. 6-8) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At access terminal 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which available technology to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from access terminal 1150 are received by antennas 1124, conditioned by receivers 1122, demodulated by a demodulator 1140, and processed by a RX data processor 1142 to extract the reverse link message transmitted by access terminal 1150. Further, processor 1130 can process the extracted message to determine which precoding matrix to use for determining the beamforming weights.

Processors 1130 and 1170 can direct (e.g., control, coordinate, manage, etc.) operation at base station 1110 and access terminal 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
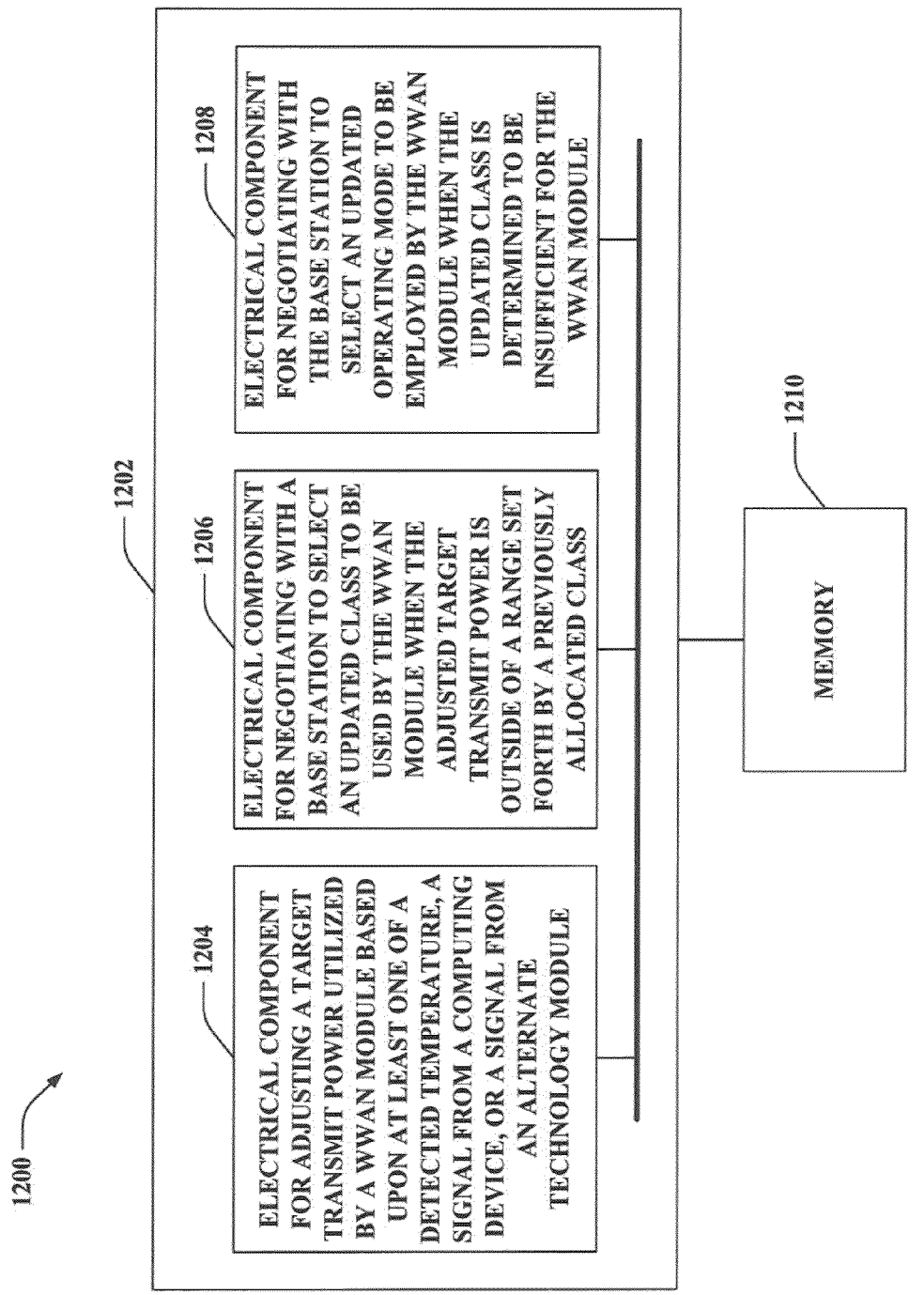
FIG. 12 is an illustration of an example system that enables throttling transmit power for a WWAN module as a function of thermal related conditions in a wireless communication environment.

With reference to FIG. 12, illustrated is a system 1200 that enables throttling transmit power for a WWAN module as a function of thermal related conditions in a wireless communication environment. For example, system 1200 can reside at least partially within an access terminal. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for adjusting a target transmit power utilized by a WWAN module based upon at least one of a detected temperature, a signal from a computing device, or a signal from an alternate technology module 1204. Further, logical grouping 1202 can include an electrical component for negotiating with a base station to select an updated class to be used by the WWAN module when the adjusted target transmit power is outside of a range set forth by a previously allocated class 1206. Moreover, logical grouping 1202 can include an electrical component for negotiating with the base station to select an updated operating mode to be employed by the WWAN module when the updated class is determined to be insufficient for the WWAN module 1208. By way of further illustration (although not shown), logical grouping 1202 can also include an electrical component for transmitting data utilizing at least one of a transmit power equal to or less than the adjusted target transmit power, the updated class, and/or the updated operating mode. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

Figure 13:
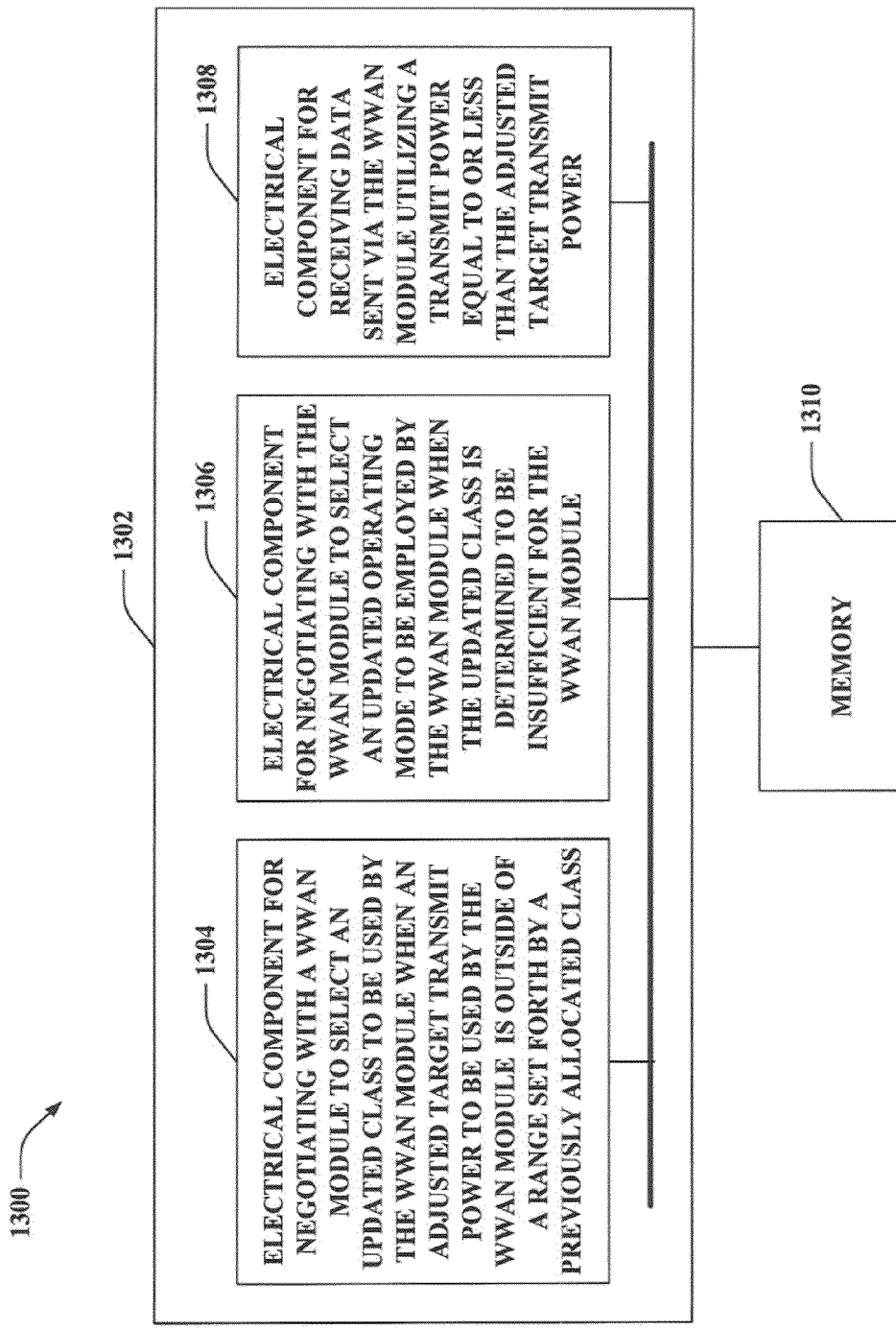
FIG. 13 is an illustration of an example system that enables coordinating control of transmit power employed by a WWAN module as a function of thermal input in a wireless communication environment.

With reference to FIG. 13, illustrated is a system 1300 that enables coordinating control of transmit power employed by a WWAN module as a function of thermal input in a wireless communication environment. For example, system 1300 can reside at least partially within a base station. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for negotiating with a WWAN module to select an updated class to be used by the WWAN module when an adjusted target transmit power to be used by the WWAN module is outside of a range set forth by a previously allocated class 1304. Moreover, logical grouping 1302 can comprise an electrical component for negotiating with the WWAN module to select an updated operating mode to be employed by the WWAN module when the updated class is determined to be insufficient for the WWAN module 1306. Further, logical grouping 1302 can include an electrical component for receiving data sent via the WWAN module utilizing a transmit power equal to or less than the adjusted target transmit power 1308. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates throttling transmit power of a WWAN module in a wireless communication environment, comprising:

determining a target transmit power to be utilized by a WWAN module as a function of an obtained temperature related input;

communicating with the base station to select a second class for the WWAN module when the target transmit power falls outside of a range associated with a previously allocated first class for the WWAN module;

communicating with a base station to coordinate a transition to the target transmit power; and sending data via the WWAN module at or below the target transmit power.

2. The method of claim 1, wherein the WWAN module is at least one of included in a computing device or removeably connectable to the computing device.

3. The method of claim 1, wherein the obtained temperature related input is a detected temperature.

4. The method of claim 3, further comprising selecting the target transmit power based upon an amount that the detected temperature is above a threshold temperature.

5. The method of claim 3, further comprising determining the target transmit power by lowering a previous target transmit power by a predetermined amount when the detected temperature is recognized to be greater than a threshold temperature.

6. The method of claim 1, wherein the obtained temperature related input is a temperature related input from an external source.

7. The method of claim 6, wherein the external source is at least one of a computing device associated with the WWAN module or an alternate technology module associated with the WWAN module.

8. The method of claim 6, wherein the temperature related input from the external source includes at least one of a request to lower a maximum transmit power or a temperature measurement yielded by the external source.

9. The method of claim 1, further comprising communicating with the base station to cooperatively select an operating mode for employment by the WWAN module when determining that a lowest practical class has been allocated to the WWAN module.

10. The method of claim 1, further comprising:

dynamically adjusting a class of the WWAN module based upon the obtained temperature related input;

transmitting a UE CAPABILITY INFORMATION command to inform the base station as to the adjustment in the class; and receiving a TRANSPORT FORMAT COMBINATION CONTROL command that enables selecting a corresponding data rate based upon the adjustment in the class, wherein the corresponding data rate correlates to an output thermal power.

11. The method of claim 1, further comprising:

sending data below the target transmit power when the WWAN module is located within close proximity of the base station; and sending data at the target transmit power when the WWAN module is located at an edge of a cell associated with the base station.

12. The method of claim 1, wherein the communicating with the base station comprises:

transmitting, to the base station, a message that signals a change in capabilities of the WWAN module.

13. The method of claim 12, wherein the communicating with the base station further comprises:

monitoring, in response to the transmitting, for an acknowledgement from the base station that the change in capabilities has been granted.

14. The method of claim 12, wherein the communicating with the base station further comprises:

receiving, in response to the transmitting, an acknowledgement from the base station that the change in capabilities has been granted.

15. A wireless communications apparatus, comprising:

a WWAN module;

a memory that retains instructions related to selecting a target transmit power for the WWAN module based upon a received input pertaining to temperature, communicating with a base station to select a second class for the WWAN module when the target transmit power falls outside of a range associated with a previously allocated first class for the WWAN module, cooperating with the base station to coordinate a transition to the selected target transmit power, and transmitting data with the WWAN module at or below the target transmit power; and a processor, coupled to the memory, configured to execute the instructions retained in the memory.

16. The wireless communications apparatus of claim 15, wherein the WWAN module is at least one of coupled to a socket of a motherboard of the wireless communications apparatus or removeably connectable to the wireless communications apparatus.

17. The wireless communications apparatus of claim 15, wherein the received input pertaining to temperature is a measured temperature.

18. The wireless communications apparatus of claim 17, wherein the memory further retains instructions related to choosing the target transmit power as a linear function of an amount that the measured temperature is above a threshold temperature.

19. The wireless communications apparatus of claim 15, wherein the memory further retains instructions related to lowering the target transmit power for the WWAN module by a predetermined amount when at least one of a measured temperature is determined to be greater than a threshold temperature, a signal is received from a computing device requesting that thermal power be lowered, or a request is received from an alternate technology module to lower the thermal power.

20. The wireless communications apparatus of claim 15, wherein received input pertaining to temperature is obtained from an external source that is at least one of a computing device or an alternate technology module, where the alternate technology module is associated with at least one of WiFi or WiMax.

21. The wireless communications apparatus of claim 15, wherein the memory further retains instructions related to communicating with the base station to cooperatively select an operating mode for employment by the WWAN module when determining that a lowest practical class has been allocated to the WWAN module.

22. A wireless communications apparatus that enables throttling transmit power for a WWAN module as a function of thermal related conditions in a wireless communication environment, comprising:

means for adjusting a target transmit power utilized by a WWAN module based upon a temperature related input;

means for communicating with a base station to select an updated class to be used by the WWAN module when the adjusted target transmit power is outside of a range set forth by a previously allocated class; and means for communicating with the base station to select an updated operating mode to be employed by the WWAN module when the updated class is determined to be insufficient for the WWAN module.

23. The wireless communications apparatus of claim 22, wherein the WWAN module is one or more of coupled to a motherboard of a computing device or removably connectable to the computing device.

24. The wireless communications apparatus of claim 22, further comprising means for transmitting data utilizing at least one of a transmit power equal to or less than the adjusted target transmit power, the updated class, or the updated operating mode.

25. The wireless communications apparatus of claim 22, further comprising means for selecting the adjusted target transmit power as a linear function of an amount that a detected temperature exceeds a threshold temperature, wherein the detected temperature is at least part of the temperature related input.

26. The wireless communications apparatus of claim 22, further comprising means for reducing the target transmit power for the WWAN module by a preset amount when at least one of a detected temperature is greater than a threshold temperature, a signal from the computing device requests that thermal power be lowered, or a signal from the alternate technology module requests that the thermal power be lowered.

27. A non-transitory computer-readable medium comprising:
code for determining a target transmit power for a WWAN module by evaluating a pre-programmed setpoint minus thermal algorithm adjustments;
code for comparing a temperature detected by the WWAN module to a threshold temperature;
code for communicating with a base station to select a second class for the WWAN module when the target transmit power falls outside of a range associated with a previously allocated first class for the WWAN module; and
code for lowering the target transmit power by a predetermined amount when the temperature detected by the WWAN module exceeds the threshold temperature.

28. A non-transitory computer-readable medium further comprising:
code for determining a target transmit power for a WWAN module by evaluating a pre-programmed setpoint minus thermal algorithm adjustments;
code for comparing a temperature detected by the WWAN module to a threshold temperature;
code for lowering the target transmit power by a predetermined amount when the temperature detected by the WWAN module exceeds the threshold temperature;
code for determining whether the lowered target transmit power is less than a target transmit power allowed by a first class allotted to the WWAN module; and
code for negotiating to a second, lower class with a network when the lowered target transmit power is less than the target transmit power allowed by the first class allotted to the WWAN module.

29. The non-transitory computer-readable medium of claim 28, further comprising code for continuing to compare the temperature detected by the WWAN module to the threshold temperature when the lowered target transmit power is greater than the target transmit power allowed by the first class allotted to the WWAN module.

30. The non-transitory computer-readable medium of claim 28, further comprising:
code for determining whether the second, lower class is a lowest practical class obtained by the WWAN module; and
code for negotiating to a disparate operating mode when the second, lower class is the lowest practical class obtained by the WWAN module.

31. The non-transitory computer-readable medium of claim 30, further comprising code for continuing to compare the temperature detected by the WWAN module to the threshold temperature when the second, lower class is not the lowest practical class obtained by the WWAN module.

32. The non-transitory computer-readable medium of claim 27, further comprising code for lowering the target transmit power by a predetermined amount when at least one of a notebook request to lower thermal power is received or an alternate technology request to lower the thermal power is received.

33. In a wireless communications system, an apparatus comprising:
a processor configured to:
alter a target transmit power utilized by a WWAN module based upon a temperature related input;
communicate with a base station to select an updated class to be used by the WWAN module when the altered target transmit power is outside of a range set forth by a previously allocated class; and
communicate with the base station to select an updated operating mode to be employed by the WWAN module when the updated class is determined to be insufficient for the WWAN module.

34. A method that facilitates coordinating WWAN module transmit power alterations based upon thermal input in a wireless communication environment, comprising:
receiving data sent from a WWAN module at or below a first target transmit power level;
communicating with the WWAN module to coordinate a transition to a second target transmit power level, the transition to the second target transmit power level being a function of a temperature related input obtained by the WWAN module; and
receiving data sent from the WWAN module at or below the second target transmit power level subsequent to the transition.

35. The method of claim 34, further comprising cooperatively selecting a class together with the WWAN module.

36. The method of claim 34, further comprising selecting a lower, second class to be used by the WWAN module when the second target transmit power level is lower than a target transmit power allowed by a first class allotted to the WWAN module.

37. The method of claim 36, further comprising selecting a second operating mode to be used by the WWAN module when the lower, second class is not practical for the WWAN while employing a first operating mode.

38. A wireless communications apparatus, comprising:
a memory that retains instructions related to coordinating a transition from a first target transmit power level to a second target transmit power level to be used by a WWAN module, the transition being based upon a temperature related input obtained by the WWAN module, and obtaining data sent from the WWAN module at or below the second target transmit power level subsequent to the transition; and
a processor, coupled to the memory, configured to execute the instructions retained in the memory.

39. The wireless communications apparatus of claim 38, wherein the memory further retains instructions related to cooperatively selecting a class together with the WWAN module.

40. The wireless communications apparatus of claim 38, wherein the memory further retains instructions related to cooperatively selecting a lower, second class to be used by the WWAN module when the second target transmit power level is lower than a target transmit power allowed by a first class allotted to the WWAN module.

41. The wireless communications apparatus of claim 40, wherein the memory further retains instructions related to selecting a second operating mode to be used by the WWAN module when the lower, second class is not practical for the WWAN while employing a first operating mode.

42. A wireless communications apparatus that enables coordinating control of transmit power employed by a WWAN module as a function of thermal input in a wireless communication environment, comprising:
   means for communicating with a WWAN module to select an updated class to be used by the WWAN module when an adjusted target transmit power to be used by the WWAN module is outside of a range set forth by a previously allocated class;
   means for communicating with the WWAN module to select an updated operating mode to be employed by the WWAN module when the updated class is determined to be insufficient for the WWAN module; and
   means for receiving data sent via the WWAN module utilizing a transmit power equal to or less than the adjusted target transmit power.

43. The wireless communications apparatus of claim 42, wherein the updated class is a lower class as compared to the previously allocated class when the adjusted target transmit power is below the range and the updated class is a higher class as compared to the previously allocated class when the adjusted target transmit power is above the range.

44. The wireless communications apparatus of claim 42, wherein the updated operating mode is one of Wideband Code Division Multiple Access (WCDMA), Code Division Multiple Access (CDMA), Enhanced Data rates for GSM Evolution (EDGE), CDMA2000, or General Packet Radio Service (GPRS).

45. A non-transitory computer-readable medium comprising:
   code for communicating with a WWAN module to identify an updated class to be used by the WWAN module when an adjusted target transmit power to be used by the WWAN module is outside of a range set forth by a previously allocated class;
   code for communicating with the WWAN module to determine an updated operating mode to be employed by the WWAN module when the updated class is determined to be insufficient for the WWAN module; and
   code for receiving data sent via the WWAN module utilizing a transmit power equal to or less than the adjusted target transmit power.

46. The non-transitory computer-readable medium of claim 45, wherein the updated class is a lower class as compared to the previously allocated class when the adjusted target transmit power is below the range and the updated class is a higher class as compared to the previously allocated class when the adjusted target transmit power is above the range.

47. The non-transitory computer-readable medium of claim 45, wherein the updated operating mode is one of Wideband Code Division Multiple Access (WCDMA), Code Division Multiple Access (CDMA), Enhanced Data rates for GSM Evolution (EDGE), CDMA2000, or General Packet Radio Service (GPRS).

48. In a wireless communications system, an apparatus comprising:
   a processor configured to:
      receive data sent from a WWAN module at or below a first target transmit power level;
      communicate with the WWAN module to coordinate a transition to a second target transmit power level, the transition to the second target transmit power level being a function of a temperature related input obtained by the WWAN module; and
      receive data sent from the WWAN module at or below the second target transmit power level subsequent to the transition.

* * * * *